(12) United States Patent
Womack

(10) Patent No.: US 10,716,267 B2
(45) Date of Patent: Jul. 21, 2020

(54) METHOD FOR FACILITATING PLANT GROWTH

(71) Applicant: W. Robert Womack, Garland, TX (US)

(72) Inventor: W. Robert Womack, Garland, TX (US)

( * ) Notice: Subject to any disclaimer, the term of this patent is extended or adjusted under 35 U.S.C. 154(b) by 0 days.

(21) Appl. No.: 15/444,158

(22) Filed: Feb. 27, 2017

(65) Prior Publication Data
US 2018/0244993 A1    Aug. 30, 2018

(51) Int. Cl.
*A01G 22/00* (2018.01)
*A01G 24/35* (2018.01)
*A01G 20/00* (2018.01)
*A01C 7/00* (2006.01)

(52) U.S. Cl.
CPC .......... *A01G 22/00* (2018.02); *A01G 20/00* (2018.02); *A01G 24/35* (2018.02); *A01C 7/008* (2013.01)

(58) Field of Classification Search
CPC ........ A01G 22/00; A01G 20/00; A01G 24/35; A01C 7/008; A01C 7/00
See application file for complete search history.

(56) References Cited

U.S. PATENT DOCUMENTS

| | | | |
|---|---|---|---|
| 4,949,656 A * | 8/1990 | Lyle | A01C 5/062 111/174 |
| 2010/0032296 A1* | 2/2010 | Pluskal | G01N 27/4473 204/601 |
| 2014/0106964 A1* | 4/2014 | Jogikalmath | A01C 1/06 504/100 |

* cited by examiner

*Primary Examiner* — Christopher J. Novosad

(57) ABSTRACT

Methods for growing plants and seeds may include blending a polyacrylamide polymer with the uppermost portion of the soil, usually top 1 inch of the soil at a rate of around 1 pound polyacrylamide per 100 square feet of soil. The polyacrylamide attaches to the roots of the plant and acts as an extension of the root system facilitating the uptake of water by the plant and increasing the soil permeability around the root system. The method also improves germination of the seeds and facilitates the growth of the resulting plants. The method may be utilized with a variety of plants, sod, and trees.

7 Claims, No Drawings

METHOD FOR FACILITATING PLANT GROWTH

BACKGROUND OF THE INVENTION

The present invention is directed to methods for facilitating plant growth in a soil through the addition of a polymeric additive to the soil. The polymeric additive acts as an extension of the root system for the supply and transport of water.

BRIEF SUMMARY OF THE INVENTION

The present invention includes methods for the planting of sod and seeds whereby the soil is blended with a polymeric additive that facilities the supply of water to the root system of the plants and increases the soil permeability around the root system.

Embodiments of the present invention include a method for planting sod comprising the steps of blending a polymeric additive with the soil to a depth ranging from about 0.5 inches to about 2 inches, wherein the polymeric additive is applied at a rate of about 0.5 pounds to about 2 pounds per 100 square feet, and applying the sod over the top of the soil.

Additional embodiments of the invention include methods for planting seeds in soil comprising the steps of blending a polymeric additive with the soil to a depth ranging from about 0.5 inches to about 2 inches, wherein the polymeric additive is applied at a rate of about 0.5 pounds to about 2 pounds per 100 square feet and planting seeds in the soil. The seeds may include, but are not limited to grass seeds, flower seeds, vegetable seeds, and crop seeds. Further, the method may include planting seeds in rows where the step of planting seeds is performed by planting seeds in a plurality of rows and the step of blending is performed by blending the polymeric additive with the soil from about 1 inch to about 6 inches across the width of each row.

Still further, embodiments of the invention may include methods for growing plants comprising blending a polymeric additive with the soil to a depth ranging from about 0.5 inches to about 2 inches around the base of a plant and in an area around the plant that is at least half the diameter of a canopy of the plant, where the polymeric additive is applied at a rate of about 0.5 pounds to about 2 pounds per 100 square feet.

Still further, embodiments of the present invention includes a method for growing plants in a container comprising the steps of blending soil and a polymeric additive at a ratio of 15:1 to about 5:1 by volume of soil to polymeric additive, adding the blended soil to the container, and burying roots of the plant or seeds in the blended soil.

DETAILED DESCRIPTION OF THE INVENTION

Embodiments of the present invention are directed to a method for growing plants and germinating seeds in which a polymeric additive is added to the upper most region of the soil in the immediate growing area for the plants. Unexpectedly, it has been found that the addition of the polymeric additive to the soil need only occur in the upper most region of the soil. As used herein, "soil" refers any particulate medium in which the plants or seeds are to be planted and may include, but is not limited to, dirt, clay, loam, sand, gravel, peat, compost, mulch, and any other similar particulate medium typically used for growing plants. The term "plant" as used herein is directed to those plants that include a root system the penetrates below the surface of a soil and includes, but is not limited to, grasses, trees, fruit trees, vegetable plants, flowers, shrubs, and agricultural crops. As used herein "seeds" may include any seeds by which a plant originates and may include but are not limited to, plant seeds, grass seeds, flower seeds, vegetable seeds, and crop seeds.

In certain embodiments of the invention, the polymer additive is applied to the soil region from about 0.5 inches up to about 2 inches from the top surface of the soil, preferably up to about 1 inch from the top surface of the soil. Surprisingly, the depth of the polymer addition in the soil of about 1 or 2 inches at the most is all that is necessary to facilitate the growth of plants and seeds. This is particularly advantageous as it conserves significant resources, such as time and energy compared to preparing deeper applications as well as conserving the amount of polymeric additive used, while having a beneficial effect on the plants.

The methods of the present invention preferably involve the application of the polymeric additive at a rate of about 0.5 pounds to about 2 pounds per 100 square feet, preferably about 1 pound per 100 square feet, to a depth ranging from about 0.5 inches to about 2 inches, preferably about 1 inch, from the top of the soil. As will be discussed below, depending upon the plants or seeds involved, the type of soil, or the area for treatment, the methods in which the polymeric additive is applied to the soil can vary.

Embodiments of the present invention utilize a polymeric additive that is a polyacrylamide polymer that is capable of absorbing about 30 to about 35 times its own volume of water and has low enough water binding tension that the absorbed water is available to the roots of the plant. The polyacrylamide polymer is preferably an acrylamide polymer that has been cross-linked with N,N'-methylene bisacrylamide. Preferably, the N,N'-methylene bisacrylamide cross-linking agent is utilized in an amount up to about 5% of the weight of the monomer and more preferably up to about 2% of the weight of the monomer.

Methods for producing the polyacrylamide polymer are known to those skilled in the art and are not part of the present invention. However, some methods may involve the acrylamide monomer and N,N'-methylene bisacrylamide in an aqueous solution, the acrylamide representing about 5-20% by weight and the cross-linking agent up to about 5%, preferably up to about 2%, of the weight of the monomer. Ammonium persulphate and tetramethylethylenediamine may be added to initiate the reaction and the reaction proceed exothermically. Preferably, the reaction temperature is maintained at about 60 C and proceeds in an oxygen free atmosphere to prevent early termination of the polymeric reaction. Once formed the polymer may be dried and ground into particulates of appropriate sizes. The size of the particulates is not particularly limited but is preferably less than 1 cm in diameter. In certain embodiments, the majority of the particles of the polymer additive have diameters that may range from about 0.1 cm to about 0.5 cm.

The polymeric additive when hydrated has sufficient tackiness that it is capable of adhering, binding, or sticking to the roots of a plant. Without intending to be bound by theory, it is believed that the adherence to the roots of the plant assists in the transport of water to the root system making water uptake more efficient for the plant. The force with which the water is bound to the polymeric additive in the swollen polymeric additive particles is of a similar order of magnitude as the capillary force effective in the plant's root system whereby in effect the polymeric additive acts as an extension of the root system giving rise to secure water retention yet permitting ready transference thereof to the plant. Advantageously, as the water is depleted from the polymeric additive, the size of the polymeric additive shrinks in volume creating or aerating the root system, thus improve the aeration porosity of the soil around the roots. Once watered again, the particles will swell or increase in size to absorb the water. This cycle of shrinking and swelling is repeated, thus providing the root system of the plant with water and porosity to aid in stimulating healthy plant growth.

Embodiments of the present invention may be directed to the planting of sod grass. In this embodiment, the top portion of the soil ranging from about 0.5 inches to about 2 inches is blended with the polymeric additive. In preferred embodiments only about 1 inch of the soil is blended with the polymeric additive. The polymeric additive is blended with the soil at a rate ranging from about 0.5 pounds per 100 square feet to about 2 pounds per 100 square feet, most preferably about 1 pound per 100 square feet.

The soil may be prepared by any method that is capable of breaking up the soil within the first one to two inches including, but not limited to, tilling or raking. The method for breaking up the soil may also be used to help blend the polymeric additive with the soil. The polymeric additive may be applied before or during the soil preparation. Application of the polymeric additive may include any conventional method for spreading particulates at a controlled rate, however, the polymer additive and soil is preferably blended together to provide a relative homogeneous mixture of soil and polymer additive in the top portion of the soil.

Once the soil is prepared and the polymer additive is blended as described above, the sod grass may be installed on the surface of the blended soil. The installed sod grass is then watered with a sufficient amount of water to hydrate the polymeric additive and assist in polymeric additive contacting the root system of the sod grass. The polymeric particles in the near vicinity of the root system of the sod grass will be close enough to the root system to effectively store and transport water to the root system and essentially act as an extension of the root system.

Further embodiments of the invention may be directed to the wide area planting of plant seeds such as seeds for grass or other agricultural crops. In this embodiment, the top portion of the soil ranging from about 0.5 inches to about 2 inches is blended with the polymeric additive. In preferred embodiments, only about 1 inch of the soil is blended with the polymeric additive. The polymeric additive is blended with the soil at a rate ranging from about 0.5 pounds per 100 square feet to about 2 pounds per 100 square feet, most preferably about 1 pound per 100 square feet. Seed may include but are not limited to grass seeds, flower seeds, vegetable seeds, and crop seeds.

As discussed previously, the soil may be prepared by any method that is capable of breaking up the soil within the first one to two inches including, but not limited to, tilling or raking. The method for breaking up the soil may also be used to help blend the polymeric additive with the soil. The polymeric additive may be applied before or during the soil preparation. Application of the polymeric additive may include any conventional method for spreading particulates at a controlled rate, however, the polymer additive and soil is preferably blended together to provide a relative homogeneous mixture of soil and polymer additive in the top portion of the soil.

The plant seeds may be applied at the same time as the polymeric additive or after the polymeric additive has been blended with the soil. The planted seeds are then watered to fully hydrate the polymeric additive and assist in the germination and growth of the plant seeds. As the plant seeds germinate and develop a root system, the polymeric particles in the near vicinity of the roots will be close enough to the root system to effectively store and transport water to the root system and essentially act as an extension of the plant root system.

Additional embodiments of the present invention are directed to the application of the polymeric additive to plant systems that are traditionally planted as row crops. When used with row crops the polymeric additive need not be applied across the entire planting area. The polymeric additive need only be applied and blended with the soil in the rows where the crop seed will be planted. The polymeric additive may be blended with the soil across the width of the row and ranging from about 1 inch to about 6 inches. Optionally, the polymeric additive may be blended with the soil along each side of the row, ranging from about 1 inch to about 6 inches and in close proximity to the planted seeds. This selective addition and application of the polymeric additive by applying the polymeric additive only in those regions which will be most beneficial during the life cycle of the row crop.

As with the embodiments discussed above, the top portion of the soil ranging from about 0.5 inches to about 2 inches along the desired row is blended with the polymeric additive. In preferred embodiments only about 1 inch of the soil along the desired row is blended with the polymeric additive. The polymeric additive is blended with the soil at a rate ranging from about 0.5 pounds per 100 square feet to about 2 pounds per 100 square feet, most preferably about 1 pound per 100 square feet.

The soil may be prepared by any conventional methods that is capable of breaking up the soil along the desired rows within the first one to two inches and may include any of the known techniques for planting row crops. Advantageously, the polymeric additive may be applied at the same time as the crop seeds are being planted. In this way, the polymeric additive and crop seed will be in close proximity and upon the addition of water, the polymeric additive will swell and assist in the germination and growth of the crop seeds. As the crop seeds germinate and develop a root system, the polymeric particles in the near vicinity of the root system will be close enough to the root system to effectively store and transport water to the root system and essentially act as an extension of the plant root system.

Additional embodiments of the invention include methods for growing grass under shade trees. Grass is typically difficult to grow and maintain under shade trees. The root system of trees is typically vast and more extensive than the root system of grass, thus dominating the uptake of water and nutrients from the soil. The application of the polymeric additive to the soil under the canopy of shades trees attaches to the root system of the grass thus acting as an extension of and water supply for the root system of the grass enabling the grass root system to better compete for water and nutrients in the area of the tree root system. In this embodiment, the top portion of the soil under the canopy of the shade tree ranging from about 0.5 inches to about 2 inches is blended with the polymeric additive. In preferred embodiments, only about 1 inch of the soil is blended with the polymeric additive. The polymeric additive is blended with the soil at a rate ranging from about 0.5 pounds per 100 square feet to about 2 pounds per 100 square feet, most preferably about 1 pound per 100 square feet.

The soil may be prepared by any conventional methods that is capable of breaking up the soil within the first one to two inches including, but not limited to, tilling or raking. The polymeric additive may be applied before or during the soil preparation. Application of the polymeric additive may include any conventional method for spreading particulates at a controlled rate.

The grass seeds may be applied at the same time as the polymeric additive or after the polymeric additive has been blended with the soil. The planted seeds are then watered to fully hydrate the polymeric additive and assist in the germination and growth of the plant seeds. As the plant seeds germinate and develop a root system, the polymeric particles in the near vicinity of the root system will be close enough to the root system to effectively store and transport water to the root system and essentially act as an extension of the root system.

If sod is desired, the sod would be applied to the surface of the prepared soil. Once installed the sod is watered to fully hydrate the polymeric additive and facility attachment to the sod root system.

The present invention also includes methods for growing existing plants such as those in planted beds, yards or fields. In this embodiment, the top the top portion of the soil around the plant ranging from about 0.5 inches to about 2 inches deep is blended with the polymeric additive. In preferred embodiments, only about 1 inch of the soil is blended with the polymeric additive. Preferably, the area of the soil to be blended with the polymeric additive is at least half the diameter of the canopy of the plant. In other embodiments, the area of the soil to be blended with the polymeric additive may range from half the diameter of the canopy of the plant to about twice the diameter of the canopy of the plant. The polymeric additive is blended with the soil at a rate ranging from about 0.5 pounds per 100 square feet to about 2 pounds per 100 square feet, most preferably about 1 pound per 100 square feet. Once the polymeric additive has been blended with the soil at the desired rate, the plant and blended soil may be watered to fully hydrate the polymer additive and facilitate contact with the root system and water transport to the root system.

The present invention may be used with containerized plants. In this embodiment, the soil used for the containerized plant is blended with the polymeric additive at a ratio ranging from about 15:1 to about 5:1 by volume of soil to the polymeric additive, where preferably the ratio is about 10:1. The blended soil is added to the container and the desired plant or seed is planted in the blended soil in the container. The root system of the desired plant or the desired seed or seeds are preferably buried in or otherwise surrounded by the blended soil. The blended soil with the polymeric additive is watered to hydrate the polymeric additive particles and facilitate contact with the roots system and water transport to the root system.

Having discussed and described embodiments of the invention in detail above, one skilled in the art will understand having read the above description that the invention has broad utility and is only to be limited by the appended claims.

What is claimed is:

1. A method for planting seeds in soil, the method comprising the steps of:
   blending a polymeric additive with the soil to a depth ranging from about 0.5 inches to about 2 inches, wherein the polymeric additive is applied at a rate of about 0.5 pounds to about 2 pounds per 100 square feet; and
   planting seeds in the soil.

2. The method of claim 1 wherein the polymeric additive is blended with the soil to a depth of about 1 inch.

3. The method of claim 1 wherein the polymeric additive is applied at a rate of about 1 pound per 100 square feet.

4. The method of claim 1 wherein the step of planting seeds is performed by planting seeds in a plurality of rows and the step of blending is performed by blending the polymeric additive with the soil from about 1 inch to about 6 inches across the width of each row.

5. The method of claim 1 wherein the seeds are selected from the group consisting of grass seeds, flower seeds, vegetable seeds, and crop seeds.

6. The method of claim 1 wherein the polymeric additive comprises a polyacrylamide polymer and wherein the polyacrylamide polymer has been cross-linked with N,N'-methylene bisacrylamide in an amount up to about 5% by weight.

7. The method of claim 6 wherein the polyacrylamide polymer has been cross-linked with N,N'-methylene bisacrylamide in an amount up to about 2% by weight.

* * * * *